United States Patent

[11] 3,608,953

| | | |
|---|---|---|
| [72] | Inventor | Albert Stevens Bernard<br>Cincinnati, Ohio |
| [21] | Appl. No. | 16,673 |
| [22] | Filed | Mar. 5, 1970 |
| [45] | Patented | Sept. 28, 1971 |
| [73] | Assignee | Ward Manufacturing, Inc.<br>Hamilton, Ohio |

[54] COLLAPSIBLE CAMPING TRAILER
12 Claims, 9 Drawing Figs.

[52] U.S. Cl............................................. 296/23,
296/27, 135/4 A, 52/66
[51] Int. Cl......................................... B60p 3/34
[50] Field of Search......................................... 296/23 A,
23 H, 27; 135/1, 3, 4, 5

[56] References Cited
UNITED STATES PATENTS
3,288,520  11/1966  Krutzikowsky...............  296/23
1,564,257  12/1925  Lippman.....................  296/23.1

*Primary Examiner*—Philip Goodman
*Attorney*—Marechal, Biebel, French & Bugg

ABSTRACT: A wheel-supported boxlike body supports a front bed and two side beds for movement between corresponding retracted positions overlying the body and corresponding extended positions projecting outwardly from the front and sidewalls of the body. The body has a rear wall which pivots to a horizontal open position forming an extension of the floor of the body at a lower level, and a utility console is movable from within the body rearwardly onto the rear wall in its open position. A rigid top is movable between a collapsed position overlying the beds and body and an elevated position covering the open rear wall and a rearward portion of the body. Canvas is supported by a tubular frame to form an extension of the top member and covers the beds in their extended positions. The canvas continues downwardly to form sidewalls which attach to the beds and the rear wall in addition to the body.

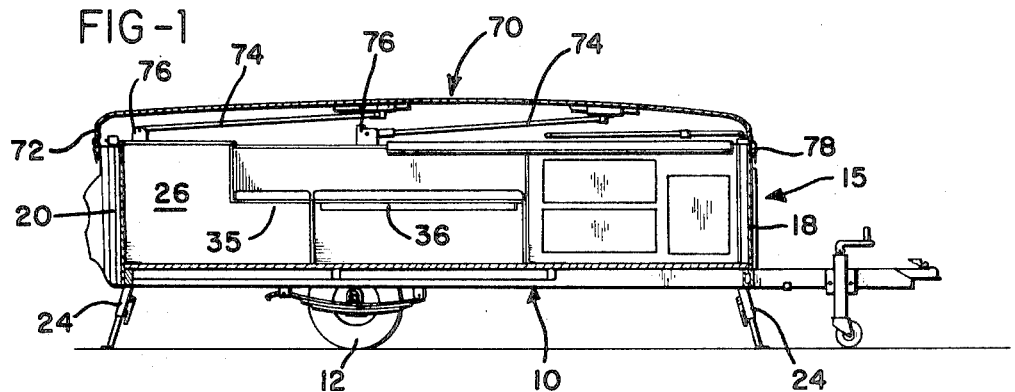
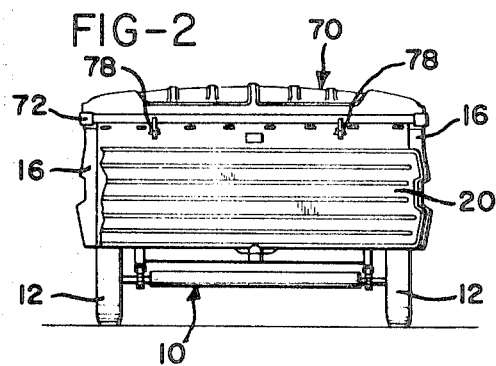
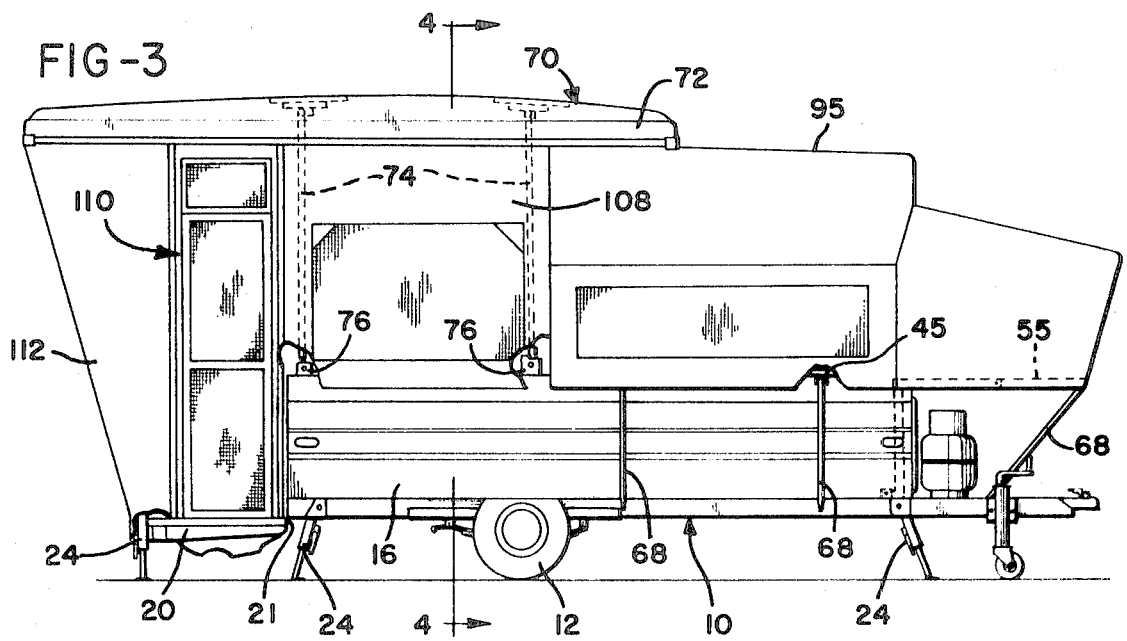
INVENTOR
ALBERT STEVENS BERNARD

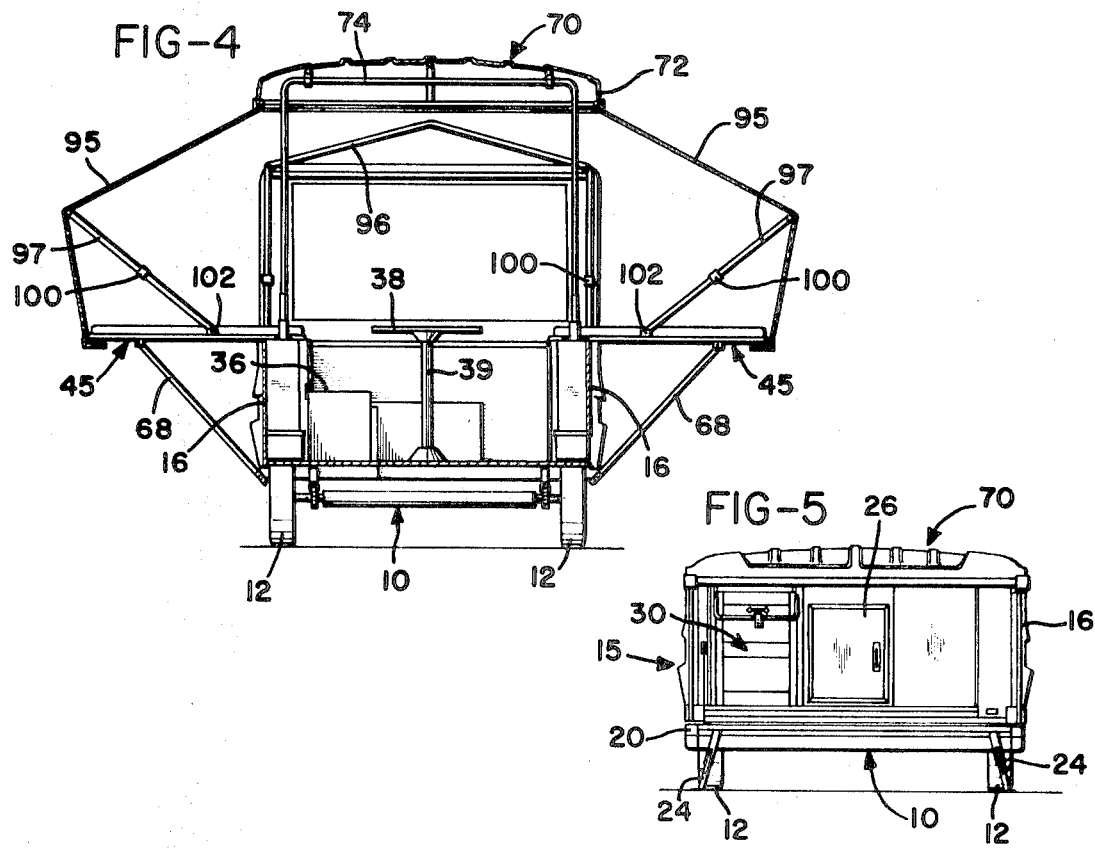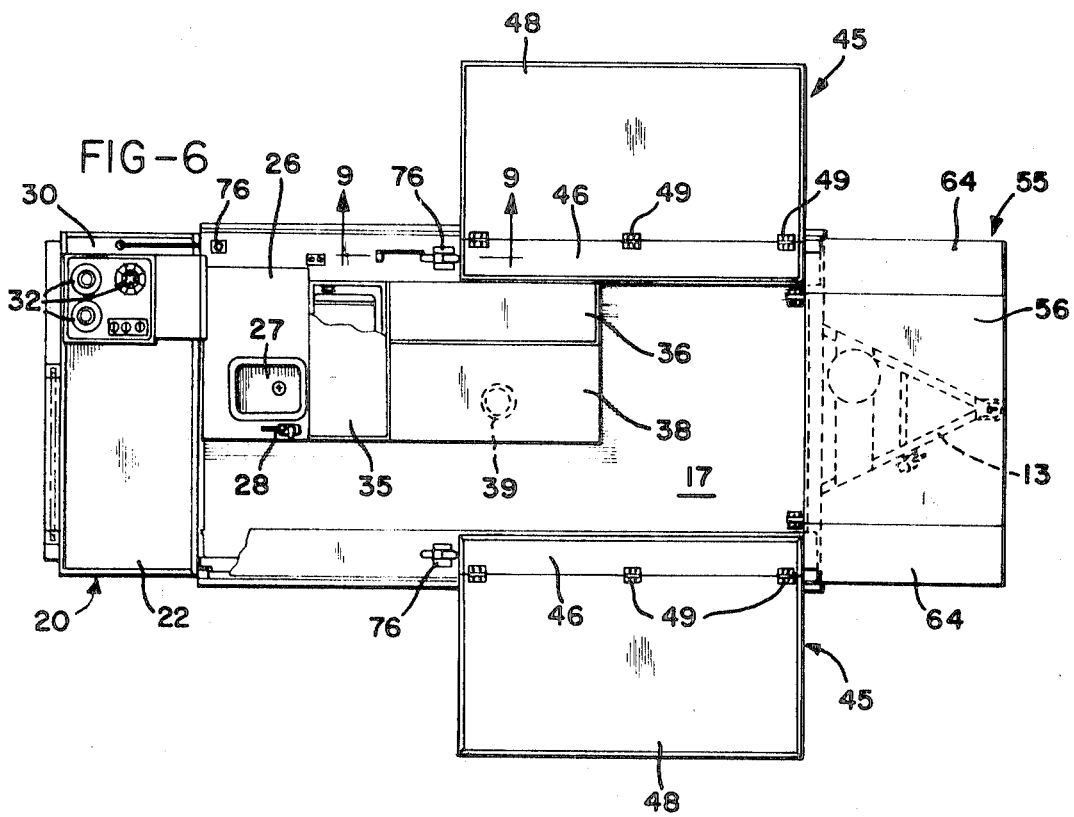

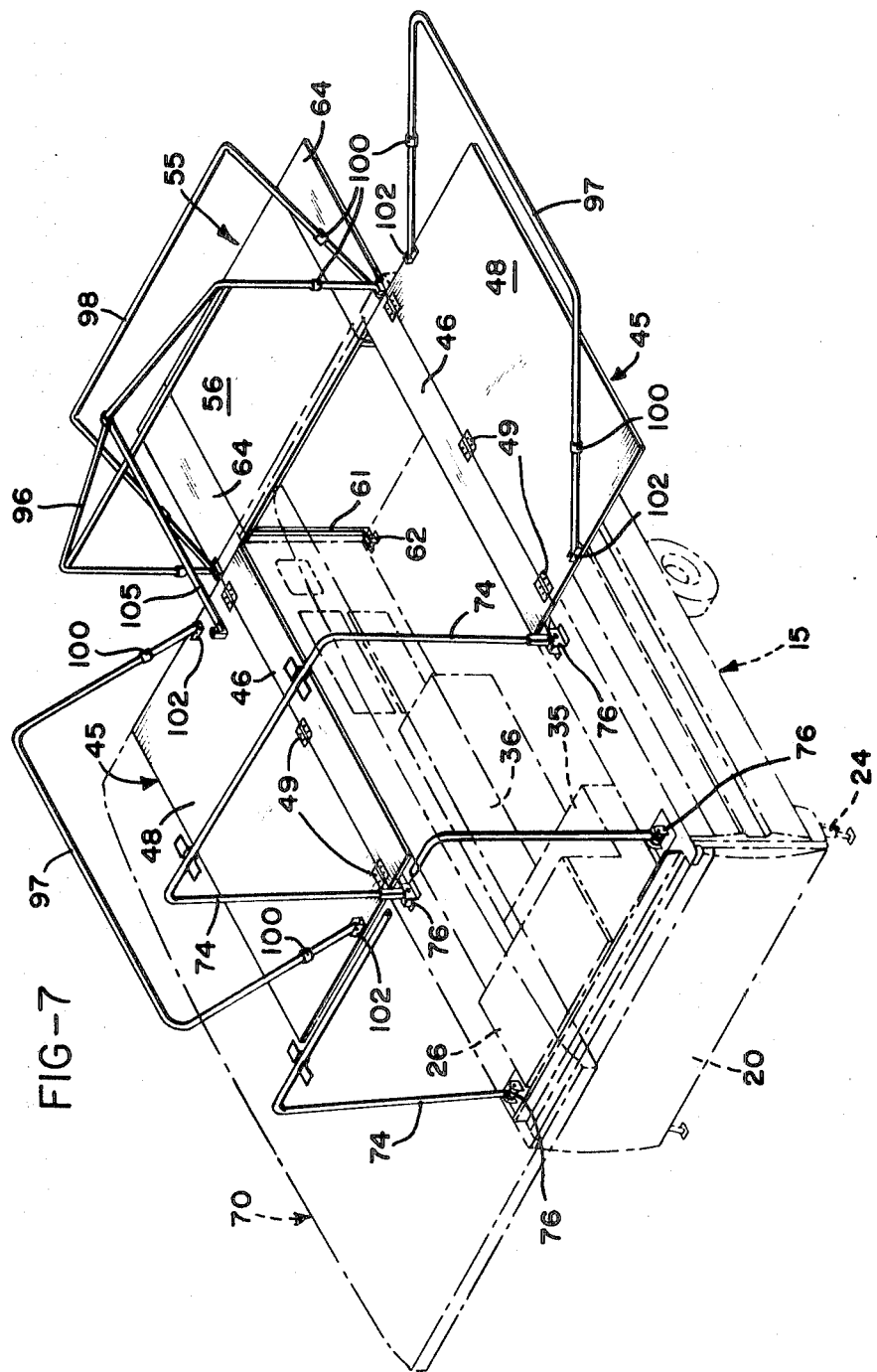

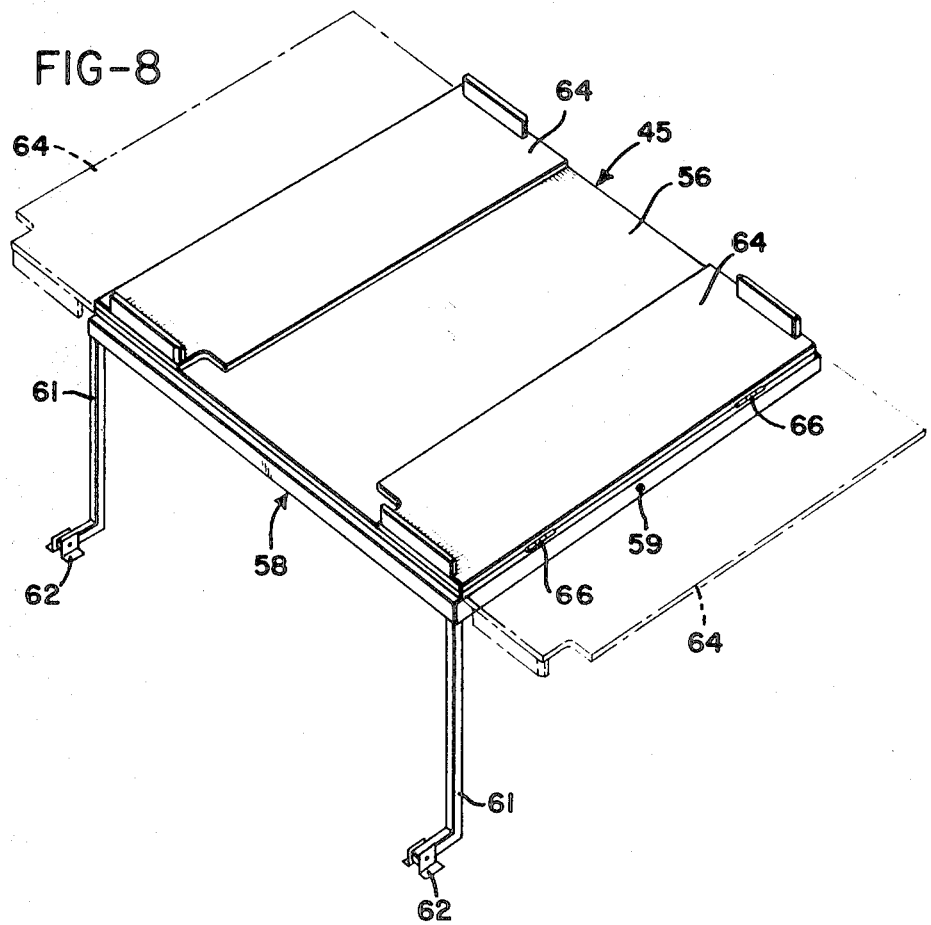
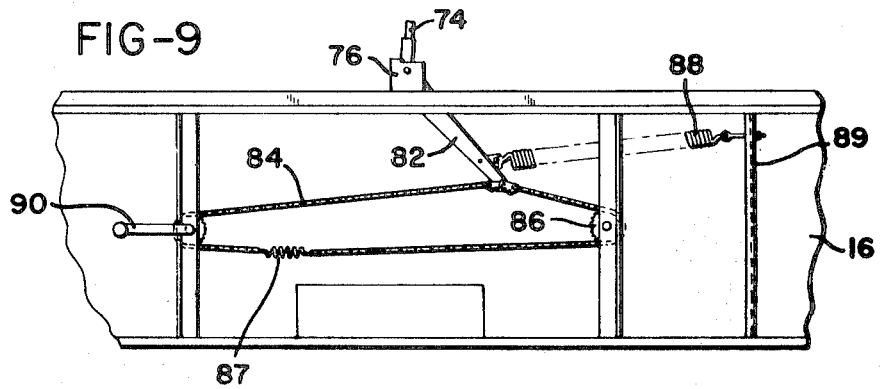

3,608,953

1

COLLAPSIBLE CAMPING TRAILER

BACKGROUND OF THE INVENTION

In a collapsible camping trailer as disclosed in U.S. Pat. No. 3,456,978 which issued to the assignee of the present invention, it is frequently desirable to provide for additional beds and additional floor space when the camping trailer is extended. One system for obtaining additional beds is to employ an upper loft or platform as disclosed in copending application Ser. No. 708,616, now U.S. Pat. No. 3,514,148, which is assigned to the assignee of the present invention. However, this system does require the use of a ladder for access to the elevated bed platform.

It is also desirable to provide a camping trailer with a rigid top member as shown in the above patent to provide a protective cover for the beds when they are retracted as well as to provide for covering the body when the beds are extended. As shown in U.S. Pat. No. 3,456,979 which issued to the assignee of the present invention, it is also frequently desirable to provide a collapsible camping trailer with a utility console which is preferably movable between a retracted position within the trailer in its collapsed condition and at least a partially extended position after the trailer is erected at a camping site.

SUMMARY OF THE INVENTION

The present invention is directed to an improved collapsible camping trailer which incorporates a plurality of extendable beds in addition to an extendable floor space when the camping trailer is erected. The camping trailer also incorporates a rigid top which cooperates with a top extension to cover the extended floorspace as well as all of the beds in their extended positions.

In accordance with a preferred embodiment of the invention, a rectangular wheel supported trailer body incorporates a rear end wall which is pivotable downwardly on a horizontal axis to form an extension of the body floor at a somewhat lower level. Adjustable stabilizing legs are carried by the end wall and are also mounted on the frame of the trailer body. A pair of bed platforms are hinged to the sidewalls of the body and are adapted to fold between inwardly overlapping positions within the body and extended positions projecting outwardly from the sidewalls of the body. An optional front bed platform is pivotally mounted on a frame which is, in turn, pivotally connected to the floor to provide for moving the front bed member between a retracted position adjacent the side bed members within the body and an extended position projecting forwardly from the front wall of the body. Another platform cooperates with a set of bunks arranged in L-shaped relation to form another bed, and is movable to an elevated position to form a table for persons sitting on the bunks.

A utility console is supported for movement between a retracted position within the trailer body and a rearwardly extended position overlying the end wall in its horizontal open position. A substantially rigid plastic top member is supported for movement between a collapsed position overlying the beds and the utility console in their retracted position and an elevated position projecting rearwardly from the rear wall in its lowered open position. Canvas is attached to the periphery of the top member and extends over adjustable inverted U-shaped bows to form an extension of the top over the beds in their extended position. The canvas continues downwardly to the sidewalls of the trailer body and to the rear wall in its open position to complete the enclosure of the camping trailer in its extended or erected condition.

Other features and advantages of the invention will be apparent from the following description, the accompanying drawings and the appended claims.

BRIEF DESCRIPTION OF THE DRAWINGS

FIG. 1 is a vertical section taken through a camping trailer constructed in accordance with the invention and shown in its collapsed condition with some internal components removed for clarity;

2

FIG. 2 is a rear elevational view of the camping trailer shown in FIG. 1;

FIG. 3 is a side elevational view of the camping trailer shown in its extended condition and with portions broken away to show interior details of construction;

FIG. 4 is a section taken generally on the line 4—4 of FIG. 3;

FIG. 5 is an end view similar to FIG. 2 but with the rear wall lowered to its open position;

FIG. 6 is a plan view of the extended trailer shown in FIG. 3 with the top and sidewalls removed;

FIG. 7 is a somewhat schematic perspective view of the internal supporting structure for the top member and the top extension;

FIG. 8 is a perspective view of the front bed platform in its extended position; and FIG. 9 is a fragmentary section taken generally on the line 9—9 of FIG. 6 and showing operating components within the left sidewall.

DESCRIPTION OF THE PREFERRED EMBODIMENT

The camping trailer shown in FIGS. 1–6 includes a chassis 10 having a pair of spring mounted wheels 12 and an extending tow bar 13 adapted to be attached to a hitch mounted on a towing vehicle. A generally rectangular body 15 is mounted on the chassis 10 and includes opposite sidewalls 16 projecting upwardly from a floor 17 and rigidly connected by a front end wall 18.

A rear end wall 20 is supported by a hinge 21 (FIG. 3) connected to the chassis 10 and is movable to a horizontal open position where the inner surface 22 (FIG. 6) forms a rearward extension of the floor 17 at a level several inches below the floor 17. A pair of extendable stabilizing legs 24 are pivotally mounted on the upper corners of the rear wall 20 and are constructed substantially as shown in application Ser. No. 642,881, which issued to the assignee of the present invention. A set of four extendable stabilizing legs 24 are also mounted on the corners of the body 15 for movement between retracted positions adjacent the body and downwardly extending supporting positions (FIGS. 1 and 3).

A cabinet 26 is positioned within the rear left corner of the body 15 and supports a sink 27 adjacent a water faucet 28. A utility console 30 including a plurality of gas-fired heating units 32, is slidably supported by tracks (not shown) for movement between a retracted position within the cabinet 26 and an extended position (FIG. 6) overlying the rear wall 20 in its open position.

A rectangular bunk 35 is positioned adjacent the forward end wall of the cabinet 26 and joins an elongated bunk 36 positioned adjacent the left sidewall 16 of the body 15 at the same elevation as the bunk 35. A rectangular platform 38 is supported adjacent the L-arrangement of the bunks 35 and 36 at the same elevation as is adapted to receive a foam rubber mattress which cooperates with the cushions on the bunks 35 and 36 to form a bed located within the body 15. The platform 38 is also adapted to be supported in an elevated position (FIG. 4) by a post 39 so that the platform may also function as a table for people sitting on the bunks 35 and 36.

A pair of side bed members of platforms 45 (FIG. 6) include elongated inner portions 46 which are secured to the upper surfaces of the sidewalls 16. Each bed platform 45 also includes an outer rectangular portion 48 which is pivotally connected to the inner portion by a series of hinges 49 so that the outer portion 48 may be moved or folded laterally between an inverted retracted position overlying the floor 17 and an extended position projecting outwardly from the corresponding sidewall 16 of the body 15.

An optional accessory, a front bed member or platform 55 (FIGS. 6–8) includes a central rectangular portion 56 which is pivotally supported by a frame 58 (FIG. 8) for rotation on a horizontal axis defined by a pair of laterally aligned bolts 59. The frame 58 includes a set of Z-shaped legs 61 each having a lower end portion pivotally connected to a bracket 62 mounted on the floor 17 of the body 15. A flap 64 is pivotally connected to each end of the platform portion 56 by a pair of hinges 66 and is foldable between a retracted position overlying the center portion 56 (FIG. 8) to an extended position, as shown by the dotted lines, flush with the center portion 56. The front bed member 55 is movable between a retracted position (not shown) overlying the forward portion of the floor 17 and an extended position (FIGS. 3 and 6) projecting forwardly from the front wall 18.

After the flaps 64 are folded outwardly, the front bed platform 55 is substantially the same size as each of the side bed platforms 45. Foam mattresses (not shown) normally stored within the body 15 are positioned on the bed platforms 45 and 55 after they are extended. As shown in FIGS. 3 and 4, each of the bed platforms 45 and 55 are braced in their extended position by a pair of bed braces 68 each of which has an upper end pivotally connected to the underneath surface of the extended bed and a lower end which engages the chassis 10.

Referring to FIGS. 1–3, a substantially rigid plastic top member 70 having a depending peripheral skirt 72 of rectangular configuration substantially the same as the body 15, is mounted on a pair of inverted U-shaped bows 74 each having the lower end of their legs pivotally connected to the upper surfaces of the sidewalls 16 by a torsion coil spring 76 in a manner as disclosed in U.S. Pat. No. 3,397,007 which issued to the assignee of the present invention. The rearward bow 74 is pivotally connected to the center portion of the top member 70, and the forward bow 74 is pivotally connected to the forward portion of the top member. Thus the top member 70 is movable in a parallelogram manner between a collapsed position (FIG. 1) covering the trailer body 15 and an elevated position where the rearward end of the top member 70 projects rearwardly of the rear wall 20 in its open horizontal position as shown in FIG. 3. When the top member 70 is in its collapsed position, a plurality of toggle clamps 78 (FIG. 2) clamp the skirt 72 of the top member to the sidewalls 16 and the end walls 18 and 20 of the body 15.

Referring to FIG. 9, an arm 82 is rigidly connected to the left leg of the forward bow member 74 and has a lower end portion secured to the ends of a bicycle chain 84 directed around a pair of sprockets 86. A tension coil spring 87 is mounted within the chain 84 to maintain a predetermined tension, and a tension coil spring 88 connects the lower end portion of the arm 82 to a frame member 89 within the left sidewall 16 of the body. A crank 90 is connected to the rear sprocket 86 and provides for manually moving the top member 70 between its collapsed and extended positions by actuating the arm 82. The spring 88 cooperates with the torsion coil springs 76 to provide torsional forces on the legs of the bows 74 for effectively counterbalancing the weight of the top member 70.

Referring to FIGS. 3 and 4, a canvas roof 95 forms a forward extension of the top member 70 and is supported by a plurality of inverted U-shaped adjustable bows 96, 97 and 98. The canvas extends downwardly to the outer edges of the bed platforms 45 and 55. Each of the U-shaped bows 96, 97 and 98 have a set of telescopic legs which are releasably secured by gripping devices 100 mounted on the ends of the upper U-shaped portion of the bow. The lower ends of the legs of each bow 97 are pivotally connected to the outer portion 48 of each bed platform 45 by a channel-shaped bracket 102 (FIG. 7). The lower ends of the legs of the bows 96 and 98 are pivotally supported by corresponding brackets 103 mounted on the upper front corners of the sidewalls 16. After the bow 96 is erected, as shown in FIG. 7, the bow 96 is connected to the forward end of the rigid top 70 by a rigid member or bar 105 having its forward end pivotally connected to the center of the bow 96 and its rearward end clamped to the lower edge of the front skirt 72.

The canvas roof 95 which forms the forward extension of the top member 70 for covering the side and front beds, is attached to canvas side panels 108 (FIG. 3) which extend vertically from the sides of the top 70 to the sides 16 of the body 15. A door 110 (FIG. 3) is erected on the rear wall 20 after it is lowered to its open position and is attached to the rearward edge of the right canvas side panel 108. A canvas wall panel 112 also extends downwardly from the rearward portion of the top 70 to the peripheral edge of the rear wall 20 in its open position so that the entire space over the bed platforms 45 and 55, the floor 17 and the lowered rear wall 20 is enclosed.

From the drawings and the above description, it is apparent that a collapsible camping trailer constructed in accordance with the present invention provides desirable features and advantages. For example, the shifting of the top member 70 rearwardly as it moves from its collapsed position to its elevated position cooperates with the rear wall 20 when it is lowered to its open position to provide a covered extension of the floor 17. This arrangement also provides for convenient access into the erected camping trailer through the door 110 which is mounted on the rear wall 20.

The support of the top member 70 by the bows 74 also provides for mounting the bed platforms 45 and 55 on the forward portion of the body 15 so that they can be conveniently extended and collapsed after the top member 70 is erected. In addition, the bow 96 and the connecting bar 105 cooperate with the adjustable bows 97 and 98 to provide a support for the canvas roof 95 to form an effective extension of the top member 70 over the side bed platforms 45 and the front bed platform 55.

The arrangement of the bunks 35 and 36 and the platform 38 provide another advantage. That is, the platform 38 is adapted to be positioned flush with the bunks 35 and 36 to form another rectangular bed or may be supported at an elevated position by the post 39 (FIG. 4) to form a table adjacent the bunks 35 and 36. Another feature is provided by mounting the utility console 30 so that it can be extended rearwardly onto the open rear wall 20 from a retracted position within the cabinet 26. This arrangement and the lower elevation of the rear wall surface 22 provides for convenient access and use of the sink 27 and the range 30 as well as the countertop surface on the cabinet 26 by a person standing on the surface 22.

While the form of camping trailer herein described constitutes a preferred embodiment of the invention, it is to be understood that the invention is not limited to this precise form of camping trailer, and that changes may be made therein without departing from the scope of the invention which is defined in the appended claims.

What is claimed is:

1. A collapsible camping trailer or the like, comprising a wheel supported body having generally parallel sidewalls connected by a floor and a front wall, a rear wall pivotally connected to said floor for swinging movement on a horizontal axis between a vertical closed position and a horizontal open position forming a rearward extension of said floor, bed means mounted on said body for movement between a retracted position overlying said body and an outwardly extending position, a substantially rigid top member, means supporting said top member for movement between a collapsed position covering said body and an elevated position spaced substantially above said body, top extension means connected to said top member and movable between collapsed and elevated positions relative to said body, and said top extension means cooperating with said top member in their corresponding extended positions to cover said bed means in said extended position, said body and said rear wall in said open position.

2. A camping trailer as defined in claim 1 wherein said supporting means for said top member is arranged to effect shifting of said top member rearwardly overlying said rear wall in said open position when said top member is moved to said elevated position.

3. A camping trailer as defined in claim 2 wherein said top member in said elevated position projects rearwardly of said rear wall in said open position, and flexible wall means connecting said top member to said rear wall in said open position.

4. A camping trailer as defined in claim 1 wherein said bed means comprise at least one bed platform disposed within the forward portion of said body in said retracted position, and means supporting said bed for movement laterally to said extended position projecting outwardly from the forward portion of one of said sidewalls of said body.

5. A camping trailer as defined in claim 4 wherein said bed means further include a second bed platform disposed within the forward portion of said body in said retracted position and overlying the first said bed platform, and means supporting said second bed platform for movement laterally to an extended position projecting outwardly from the forward portion of the other said sidewall of said body.

6. A camping trailer as defined in claim 4 wherein said bed means further include a front bed platform, and means supporting said front bed platform for movement between a retracted position adjacent said first bed platform and an extended position projecting forwardly of said front wall.

7. A camping trailer as defined in claim 6 wherein said front bed platform includes a center portion and at least one end portion movable laterally between a collapsed position and an extended position relative to said center portion.

8. A camping trailer as defined in claim 6 wherein said supporting means for said front bed platform includes a frame pivotally connected to said body and to said front bed platform, and said frame provides for maintaining said front bed platform substantially horizontal during movement between said retracted and extended positions.

9. A camping trailer as defined in claim 6 including an inverted generally U-shaped bow having lower ends pivotally connected to said body and adapted to support said top extension means in said elevated position, and a rigid link member for connecting said bow to said top member in said elevated position.

10. A camping trailer as defined in claim 1 including a utility console, and means supporting said utility console for movement between a retracted position within said body and an extended position overlying said rear wall in said open position.

11. A camping trailer as defined in claim 1 including a plurality of elongated stabilizing legs each mounted on said rear wall for movement between a retracted position adjacent said rear wall and a downwardly extending supporting position, and means for extending each said leg longitudinally in said supporting position.

12. A camping trailer as defined in claim 1 wherein the inner surface of said rear wall is positioned below said floor of said body when said rear wall is in said open position.